US010763961B2

(12) United States Patent
Newell et al.

(10) Patent No.: US 10,763,961 B2
(45) Date of Patent: Sep. 1, 2020

(54) FREE-SPACE OPTICAL TERMINAL

(71) Applicant: The Johns Hopkins University, Baltimore, MD (US)

(72) Inventors: Katherine T. Newell, Elkridge, MD (US); Juan C. Juarez, Ellicott City, MD (US); Michelle P. O'Toole, Columbia, MD (US); Radha A. Venkat, Columbia, MD (US); Lauren S. Weiss, Baltimore, MD (US); Ryan P. DiNello-Fass, Mount Airy, MD (US)

(73) Assignee: The John Hopkins University, Baltimore, MD (US)

(*) Notice: Subject to any disclaimer, the term of this patent is extended or adjusted under 35 U.S.C. 154(b) by 0 days.

(21) Appl. No.: 16/558,049

(22) Filed: Aug. 31, 2019

(65) Prior Publication Data

US 2020/0220619 A1 Jul. 9, 2020

Related U.S. Application Data

(60) Provisional application No. 62/787,941, filed on Jan. 3, 2019.

(51) Int. Cl.
*H04B 10/112* (2013.01)
*G02B 6/42* (2006.01)
*G02B 6/04* (2006.01)

(52) U.S. Cl.
CPC .......... *H04B 10/1125* (2013.01); *G02B 6/04* (2013.01); *G02B 6/4202* (2013.01)

(58) Field of Classification Search
CPC combination set(s) only.
See application file for complete search history.

(56) References Cited

U.S. PATENT DOCUMENTS

| | | | | |
|---|---|---|---|---|
| 2002/0012139 A1* | 1/2002 | Willebrand | ............ | H04B 10/40 398/115 |
| 2002/0196506 A1* | 12/2002 | Graves | ............... | H04B 10/1125 398/126 |
| 2004/0136666 A1* | 7/2004 | Bruun-Larsen | .......... | G02B 6/32 385/115 |
| 2004/0208596 A1* | 10/2004 | Bringans | ............... | H04B 10/801 398/130 |
| 2004/0217268 A1* | 11/2004 | Tobiason | ........... | G01D 5/34723 250/231.13 |
| 2009/0028502 A1* | 1/2009 | Presley | .................. | G02B 6/352 385/18 |
| 2009/0304328 A1* | 12/2009 | Presley | .................. | G02B 6/356 385/16 |

(Continued)

*Primary Examiner* — Omar S Ismail
(74) *Attorney, Agent, or Firm* — Noah J. Hayward (57) ABSTRACT

A device includes an optical fiber bundle having at least one optical data fiber and at least three optical tracking fibers, a mirror package configured to direct an incoming optical beam to the optical fiber bundle, at least three detectors, each detector corresponding to one of the at least three optical tracking fibers, the at least three detectors configured to receive portions of the incoming optical beam from the corresponding optical tracking fibers and convert the portions of the incoming beam to electrical tracking signals, and a controller configured to receive the electrical tracking signals from the at least three detectors and generate a feedback control based on the electrical tracking signals to control a position of the mirror package.

20 Claims, 5 Drawing Sheets

(56) References Cited

U.S. PATENT DOCUMENTS

| | | | | |
|---|---|---|---|---|
| 2010/0046884 A1* | 2/2010 | Presley | ............... | G02B 6/3512 |
| | | | | 385/17 |
| 2011/0235972 A1* | 9/2011 | Ruggiero | ............. | G02B 6/2817 |
| | | | | 385/35 |
| 2013/0315604 A1* | 11/2013 | LoPresti | ............. | H04B 10/271 |
| | | | | 398/116 |
| 2017/0017042 A1* | 1/2017 | Menard | ............... | H01S 5/02216 |
| 2018/0069631 A1* | 3/2018 | Ashrafi | ................... | G02B 6/14 |

* cited by examiner

FREE-SPACE OPTICAL TERMINAL

CROSS REFERENCE TO RELATED APPLICATIONS

This application claims priority to and the benefit of U.S. Provisional Application No. 62/787,941 filed on Jan. 3, 2019, the entire disclosure of which is incorporated herein by reference.

STATEMENT OF GOVERNMENTAL INTEREST

This invention was made with Government support under contract number N00024-13-D-6400 awarded by the Naval Sea Systems Command (NAVSEA). The Government has certain rights in the invention.

BACKGROUND

The disclosure relates generally to free-space optical (FSO) terminals, and more particularly, to a simplified FSO terminal architecture.

Conventionally, two monostatic FSO terminals in conjunction with two corresponding optical modems establish and utilize a data link to send and receive optical data signals. Due to a high directionality of the data link, very high precision beam steering is required. Thus, the two monostatic FSO terminals include and utilize some sort of beam steering element (e.g., a tip/tilt mirror) to actively point, send, and receive, therebetween, and the optical data signals generated by the corresponding optical modems. For closed loop tracking, portions of those optical data signals are used for position information to achieve an optical alignment for the data link, while data of these signals is parsed and processed. In this regard, the two monostatic FSO terminals utilize separate quadrant/position sensing detectors to track the incoming optical data signal and generate an error signal for controlling the beam steering element.

For example, a first optical modem generates and provides an outgoing optical data signal to an optical fiber of a first monostatic FSO device. The optical fiber directs the outgoing optical data signal to a first beam steering element of the first monostatic FSO device, which projects the outgoing optical data signal as a beam to a second monostatic FSO device. The second monostatic FSO device receives the beam, as an incoming optical data signal, through its aperture. In conventional monostatic FSO terminals, an additional, second beam steering element is needed in the second monostatic FSO device (in this example) to direct, through a passive beam splitter, a portion of the beam to a quadrant/position sensing detector in the second monostatic FSO device. The quadrant/position sensing detector provides position information to a controller of the second monostatic FSO device that adjusts the first beam steering element as needed to achieve an optical alignment between the first and second monostatic FSO terminals. A remainder of the beam, which includes the data, is received and passed by an optical fiber of the second monostatic FSO device to a second optical modem for processing. Note that, at the same time, the second monostatic FSO device is also sending an outgoing optical data signal that is received and processed by the first monostatic FSO device in a similar manner.

Optical alignment between the two monostatic FSO terminals is a key consideration that introduces significant complexity and cost to the design of these monostatic FSO terminals. In particular, any drift in a relative optical axis between the optical fibers and the quadrant/position sensing detectors can result in highly degraded acquisition and tracking of the optical data signals. Further, any significant misalignment before an initial acquisition of the optical alignment could prevent ever acquiring the data link between the monostatic FSO terminals.

Additionally, the quadrant/position sensing detectors include at least three (e.g., four) individual detectors and a common cathode. The common cathode is shared by and, in turn, sets a noise floor for the at least four individual detectors. Thus, the common cathode limits the noise floor to higher levels, which furthers limits the acquisition and tracking link margin for the monostatic FSO terminals.

Thus, there is a need for an improved FSO device/system that overcomes at least these deficiencies of conventional FSO terminals/systems.

BRIEF DESCRIPTION

According to one or more embodiments, a device includes an optical fiber bundle having at least one optical data fiber and at least three optical tracking fibers, a mirror package configured to direct an incoming optical beam to the optical fiber bundle, at least three detectors, each detector corresponding to one of the at least three optical tracking fibers, the at least three detectors configured to receive portions of the incoming optical beam from the corresponding optical tracking fibers and convert the portions of the incoming beam to electrical tracking signals, and a controller configured to receive the electrical tracking signals from the at least three detectors and generate a feedback control based on the electrical tracking signals to control a position of the mirror package.

According to one or more embodiments, a system includes a first network comprising a first optical terminal, a second network comprising a second optical terminal, and an optical data link established between the first and second optical terminals. The first optical terminal includes an optical fiber bundle having at least one optical data fiber and at least three optical tracking fibers, a mirror package configured to direct an incoming optical beam to the optical fiber bundle, at least three detectors, each detector corresponding to one of the at least three optical tracking fibers, the at least three detectors configured to receive portions of the incoming optical beam from the corresponding optical tracking fibers and convert the portions of the incoming optical beam to electrical tracking signals, and a controller configured to receive the electrical tracking signals from the at least three detectors and generate a feedback control based on the electrical tracking signals to control a position of the mirror package.

According to one or more embodiments, a method includes capturing, by a mirror package and an optical fiber bundle of a first optical terminal, an incoming beam from a second optical terminal, converting, by a plurality of detectors coupled to the optical fiber bundle, the incoming beam into a tracking signal, processing, by a controller of the optical terminal, the tracking signal to generate alignment information and determine, based on the alignment information, whether an alignment of the incoming beam is correct, and articulating, by the controller, the mirror package based on the alignment information, when the alignment of the incoming beam is not correct.

Additional features and advantages are realized through the techniques of the present disclosure. Other embodiments and aspects of the disclosure are described in detail herein.

For a better understanding of the disclosure with the advantages and the features, refer to the description and to the drawings.

BRIEF DESCRIPTION OF THE DRAWINGS

The subject matter is particularly pointed out and distinctly claimed in the claims at the conclusion of the specification. The forgoing and other features, and advantages of the embodiments herein are apparent from the following detailed description taken in conjunction with the accompanying drawings, in which:

DETAILED DESCRIPTION

A simplified FSO terminal architecture is provided herein. This architecture at least utilizes an optical fiber bundle in contrast to conventional monostatic FSO terminals. The optical fiber bundle can include three or more tracking fibers to act as the quadrant/position sensing detector and include a data fiber to transmit and receive data.

Figure 1:
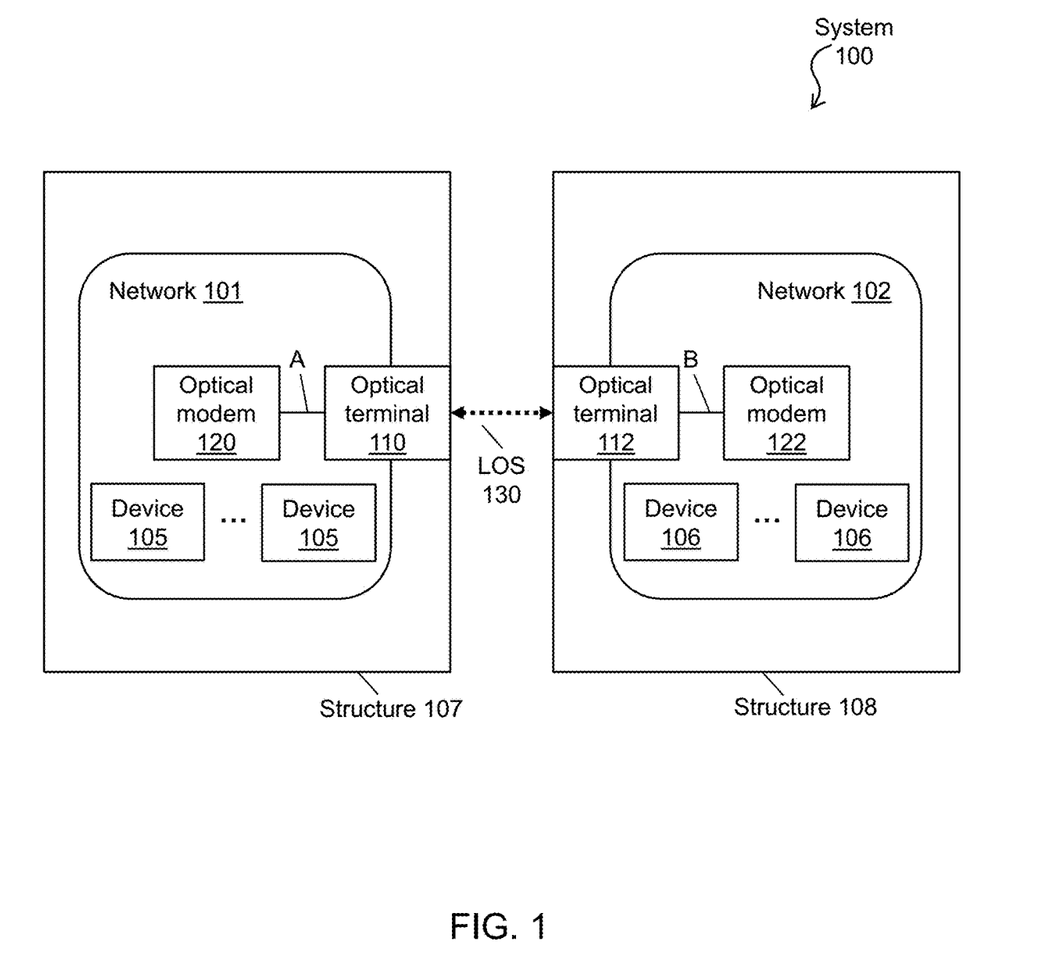
FIG. 1 depicts a system including two optical terminals connecting two networks according to one or more embodiments.

Turning now to FIG. 1, a system 100 is depicted according to one or more embodiments. The system 100 can include at least two networks (e.g., a first network 101 and a second network 102), with a plurality of devices 105 and 106 included respectively therein.

The networks 101 and 102 can be any type of network, for example, a local area network, a wide area network, a wireless network, and/or the Internet, including copper transmission cables, optical transmission fibers, wireless transmissions, routers, firewalls, switches, gateway computers, edge servers, and/or the like. The devices 105 and 106 can be any electronic or computing devices and components, such as desktops, laptops, servers, tablets, phones, digital assistants, e-readers, and the like.

The networks 101 and 102 reside with respect to stationary locations and/or mobile objects, such as a ship, a ground vehicle, an aircraft, a satellite, a building, a spaceship, a tower, a light house, a buoy, and the like, where a cost of running physical cables there between is prohibitive and/or impractical. As shown in FIG. 1, the networks 101 and 102 reside in separate locations or structures, such as structures 107 and 108. In accordance with one or more embodiments, the structures 107 and 108 can be high-rise buildings in a location where a cost of running physical cables therebetween is prohibitive and/or impractical.

The networks 101 and 102 support communications respectively between the devices 105 and 106. Further, the networks 101 and 102 are connected by at least two optical terminals 110 and 112 and corresponding optical modems 120 and 122 (e.g., the first network 101 includes a first optical terminal 110, and the second network 102 includes a second optical terminal 112). In this way, the networks 101 and 102 may be in any location so long as a line of sight (LOS) 130 is present between the two optical terminals 110 and 112. In turn, the two optical terminals 110 and 112 can establish an optical data link, over-the-air across/along the LOS 130 (e.g., a free-space between the structures 107 and 108), so that at least one device 105 of the network 101 can communicate with at least one device 106 of the network 102, and vice versa.

The optical terminals 110 and 112 can be any free-space optical electronic, computer framework including and/or employing any number and combination of computing devices and components utilizing various communication technologies, as described herein. The optical terminals 110 and 112 can be easily scalable, extensible, and modular, with the ability to change to different services or reconfigure some features independently of others. The optical terminals 110 and 112 interface with the optical modems 120 and 122 via optical fibers A and B that capture incoming signals and/or that launch outgoing signals into the free-space between the structures 107 and 108 (e.g., over-the-air across/along the LOS 130). The optical fibers A and B and the optical modems 120 and 122 can utilize single-mode communications for higher data rates, e.g., greater than 10 Gigabits per second (Gbps), or multimode communications for lower data rates (e.g., less than 1 Gbps), as the optical terminals 110 and 112 permit universal interfacing with different hardware and alternative configurations. Note that the optical terminals 110 and 112 leverage a reciprocity of the incoming/outgoing signals, in that the optical terminals 110 and 112 launch the outgoing signal out of a same aperture as the incoming signal is received and adjust a pointing of the outgoing signal based on an angle of the incoming signal.

Figure 2:
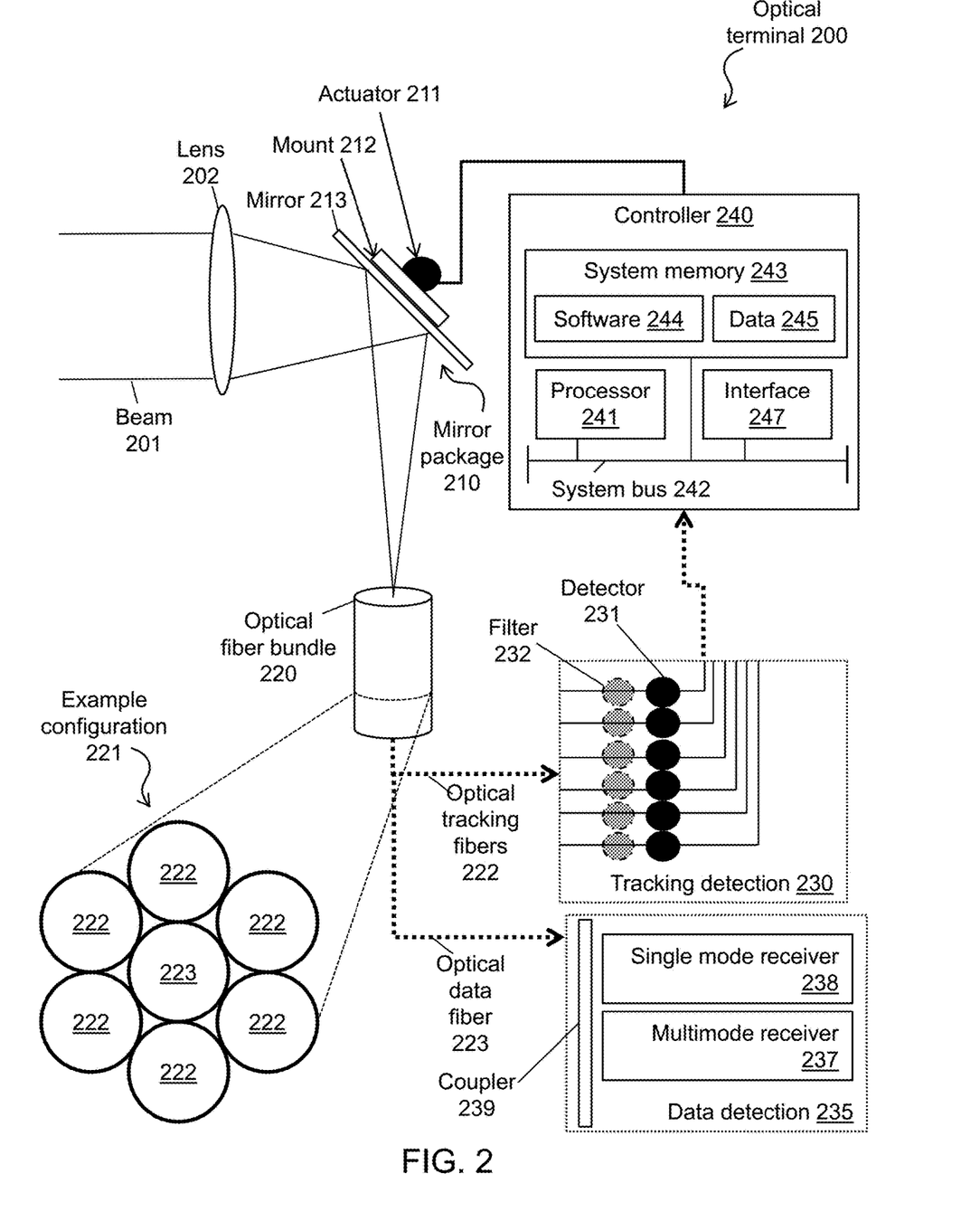
FIG. 2 depicts an optical terminal according to one or more embodiments.

FIG. 2 depicts an optical terminal 200 according to one or more embodiments. The optical terminal 200 is an example of the simplified FSO terminal architecture described herein and/or the optical terminals 110 and 112 of FIG. 1.

The optical terminal 200 captures or receives a beam 201 (e.g., an incoming optical beam 201 or an optical data signal 201; note that, while an incoming portion of the beam 201 is described for ease of explanation, the illustrated beam 201 can be further representative of an incoming/outgoing optical beam(s) or data signal(s)). The beam 201, for example, can be an emission of light through optical amplification via a stimulated emission of electromagnetic radiation, sometimes referred to as a laser beam or laser. In accordance with one or more embodiments, the beam 201 includes data sent by the opposite terminal.

The beam 201 is received through front-end optics, such as a lens 202. The lens 202 (e.g., a telescope/lens assembly) can be any transmissive optical device (e.g., a single piece of transparent material or a compound unit including several pieces arranged along a common axis) that focuses or disperses the beam 201 by means of refraction. The lens 202 directs the beam 201 to a mirror package 210, which further steers or directs the beam 201 to an optical fiber bundle 220. For example, the lens 202 captures and the mirror package 210 steers the beam 201 onto the optical fiber bundle 220.

The mirror package 210 includes at least an actuator 211, a mount 212, and a mirror 213, e.g., a steering mirror 213. Examples of the mirror package 210 include a single tip/tilt mirror configuration and a fast steering mirror (FSM) configuration. The actuator 211 can be any electric device that converts electrical energy into mechanical torque by using the electrical energy to articulate the steering mirror 213 based on control signals. Examples of the actuator 211 include an electric motor, a hydraulic cylinder, a piezoelectric element, a solenoid, etc. The mount 212 can be any gimbal or dynamic two-axis mount that permits movement by the actuator 211 of angles of the steering mirror 213. The steering mirror 213 can be any reflective surface fixed to the mount 212 that directs the beam 201 to the optical fiber bundle 220. The actuator 211, in response to control signals, can move the steering mirror 213 (as supported by the mount 212) to any desired position so as to direct the beam 201 to the optical fiber bundle 220 and achieve alignment, The optical fiber bundle 220 is a dual use bundle (e.g., it is used for both data and position) that receives the beam 201 from the mirror package 210. The optical fiber bundle 220 can include at least one optical data fiber (e.g., for a first use) and at least three optical tracking fibers (e.g., for a second use) to transmit and receive data. In this regard, the technical effect and benefit of the optical terminal 200 is to provide the optical fiber bundle 220 as a single optical element that combines the separate optical fiber and quadrant/position sensing detector elements of conventional monostatic FSO terminals.

In accordance with one or more embodiments, in an example configuration 221, the optical fiber bundle 220 includes six optical tracking fibers 222 and one optical data fiber 223. The six optical tracking fibers 222 can be arranged in a ring around the optical data fiber 223. As shown in FIG. 2, for example, the optical fiber bundle 220 can include these seven fibers arranged in a packed hexagonal configuration, e.g., the six optical tracking fibers 222 form an outer hexagon around the optical data fiber 223. The optical data fiber 223 can be a single mode fiber, a multimode fiber, or a double clad fiber (DCF; also referred to herein as a "double clad data fiber"). A DCF can be used as the data fiber to provide mode diversity and universality in interfacing with a variety of optical modems (e.g., the optical modems 120 and 122 of FIG. 1).

Figure 3:
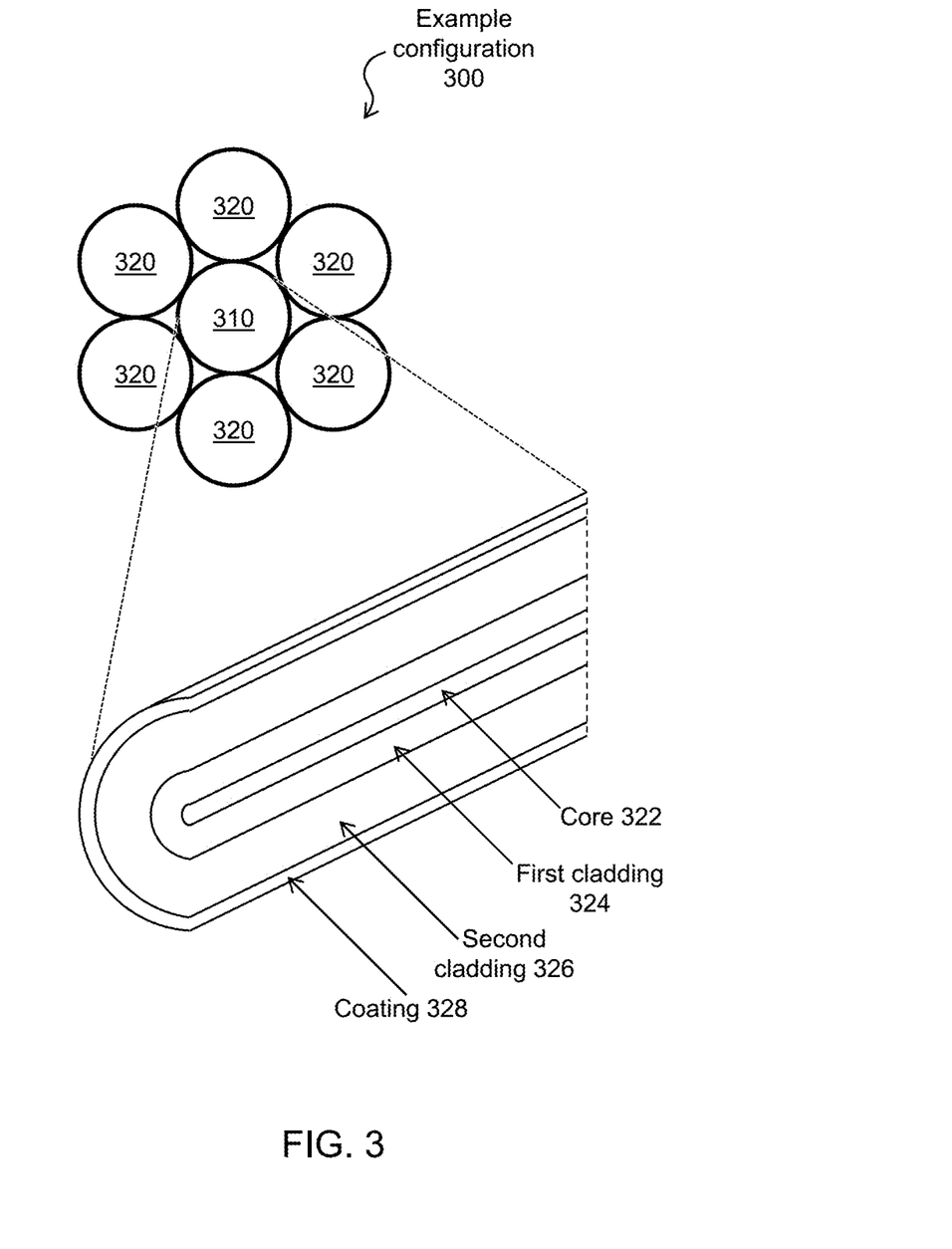
FIG. 3 depicts an optical fiber bundle according to one or more embodiments.

For example, as shown in FIG. 3, an example configuration 300 of the optical fiber bundle 200 of FIG. 2 includes an optical data fiber 310 and six optical tracking fibers 320. The six optical tracking fibers 320 can be arranged in a ring around the optical data fiber 310 and used to track a position of the beam 201 of FIG. 2. In accordance with one or more embodiments, the optical data fiber 310 can also be used to generate tracking information as well. The optical data fiber 310 (e.g., a center data transmit/receive fiber) can be the DCF including a core 322, a first cladding 324, a second cladding 326, and a coating 328. The double clad data fiber supports both single mode and multimode operations simultaneously via the use of two claddings (e.g., the first and second claddings 324 and 326). Thus, a technical effect and benefit of using the double clad data fiber in the example configuration 300 includes enabling the optical terminal 200 to be interchangeable with either single mode or multimode fibers (e.g., the optical fibers A and B and the optical modems 120 and 122 of FIG. 1.

The six optical tracking fibers 222 are used to track a position of the beam 201. In accordance with one or more embodiments, the six optical tracking fibers 222 are multimode to provide a widest acceptance angle, but alternative example embodiments are not limited thereto. In accordance with one or more embodiments, the optical data fiber 223 can also be used to generate tracking information as well. A technical effect and benefit of using the optical fiber bundle 220 includes eliminating a susceptibility to misalignment between the separate optical fiber and quadrant/position sensing detector elements of the conventional monostatic FSO terminals because a relative alignment of the seven fibers in the optical fiber bundle 220 is fixed.

Regarding tracking detection 230 (FIG. 2), the at least three optical tracking fibers (e.g., six optical tracking fibers 222) of the optical fiber bundle 220 communicate the beam 201 or portions thereof to at least three detectors 231. The at least three detectors 231 can be any transducer, sensor, photo-sensor, or photo-detector that converts light photons of the beam 201 into current or other electromagnetic radiation. Examples of the detectors 231 include, but are not limited to photodiodes and phototransistors. The at least three detectors 231 receive the beam 201 from the optical fiber bundle 220, where each detector 231 corresponds to one of the at least three optical tracking fibers (e.g., six optical tracking fibers 222) of the optical fiber bundle 220. As shown in FIG. 2 in the tracking detection 230 block, six detectors 231 can be employed in accordance with one or more embodiments. The at least three detectors 231 then converts the beam 201 to an electrical signal (e.g., the beam 201 is focused through the lens assembly 202 such that when it hits the optical fiber bundle 220, light that is not captured by the optical data fiber 223 spills over onto the optical tracking fibers 222 and is converted to multiple electrical signals).

In accordance with one or more embodiments, the optical terminal 200 can optionally utilize wavelength filtering. In this regard, the optical terminal 200 can include one or more filters 232, such as fiber based bandpass filters 232, (e.g., optical filters) arranged in front of the detectors 231 so that only expected incoming wavelengths are tracked. In an example embodiment, the filters 232 are placed directly in front of corresponding detectors 231. A technical effect and benefit of the fiber based bandpass filters 232 before the detectors 231, in contrast to the free space bandpass filters required for conventional position detection using the quadrant/position sensing detector, includes being able to utilize fiber based switches to swap in filter banks to allow for rapid red/blue terminal reconfiguration.

Further, the optical data fiber 223 communicates the beam 201 or portions thereof to a data detection 235 block/portion. The data detection 235 block is representative of multimode receivers 237 and/or single mode receivers 238 that convert the optical data signals of the optical data fiber 223 to electrical signals.

Regarding the data detection 235 block, a data portion of the beam 201 can be directed to the multimode receiver 237 and/or the single mode receiver 238 through a coupler 239. The multimode and single mode receivers 237 and 238 can be any device that receives information as light (e.g., an optical signal or the beam 201). Note that single-mode refers to an optical signal designed to carry only one or single ray of light, while multimode refers to an optical signal able to transmit multiple modes or light rays simultaneously, each at a different reflection angle. The coupler 239 is further described with respect to FIG. 4.

Figure 4:
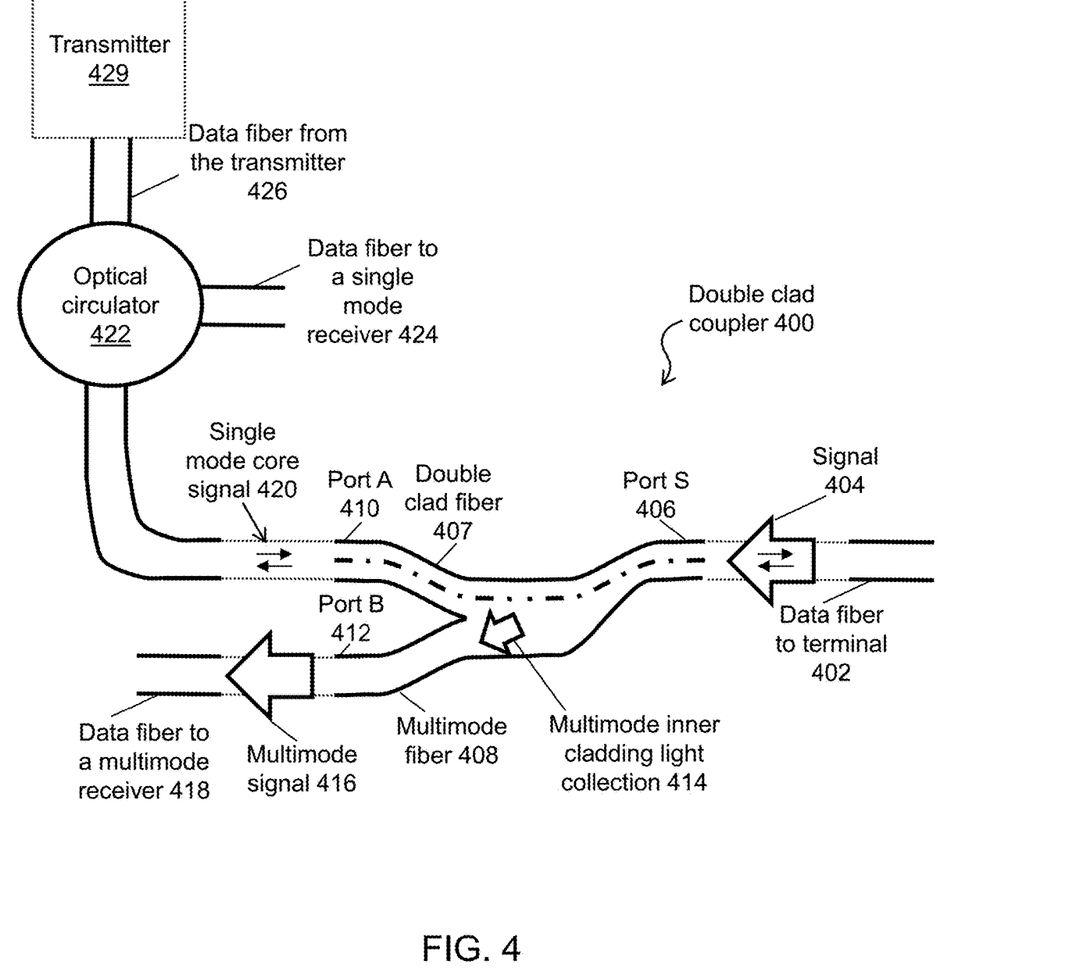
FIG. 4 depicts a double clad coupler according to one or more embodiments.

FIG. 4 depicts a double clad coupler 400 according to one or more embodiments. The double clad coupler 400 (an example of the coupler 239 of FIG. 2) provides mode diversity (e.g., for the optical data fiber 310 of FIG. 3), as it supports both multimode and single mode receivers 237 and 238. The double clad coupler 400 connects to a data fiber to the terminal 402, on which a signal 404 is conducted, via a port S 406. From the port S 406, the double clad coupler 400 divides into a double clad fiber 407 and a multimode fiber 408. The double clad fiber 407 leads to a port A 410, and the multimode fiber 408 leads to a port B 412.

The signal 404 is both single mode and multimode signal. In this regard, the signal 404 is divided at a multimode inner cladding light collection 414, so that a multimode signal 416 can proceed to a data fiber 418 connected to a multimode receiver (e.g., 237). Further, a single mode core signal 420 can proceed to an optical circulator 422, where data fibers 424 and 426 are connected to and from a single mode receiver (e.g., 238) and a transmitter 429. The optical circulator 422 is a fiber-optic component used to separate optical signals that travel in opposite directions. In this regard, the optical circulator 422 can be a three-port device that circulates between signals from the transmitter 429 and to the single mode receiver (e.g., 238). The transmitter 429 is any device that sends information as light (e.g., an optical signal or the beam 201).

The technical effects and benefits of the double clad coupler 400 of FIG. 4 include permitting an implementation of a diversity scheme for mitigating deleterious effects (e.g., intensity fades and wave front aberrations introduced by atmospheric turbulence) by allowing the simultaneous use of both single mode and multimode receiver architectures. Intensity fades reduce an amount of link margin available and can introduce burst errors in the link when a power momentarily drops below a receiver sensitivity. Wave front aberrations decrease a coupling efficiency of a received signal into a single mode fiber. Thus, embodiments herein provide mitigation techniques, such as utilizing both single mode and multimode receiver architectures that monitor incoming data and ingest valid packets received on either path. In such a design, the double clad coupler 400 of FIG. 4 maximizes the benefits of both approaches, as the single mode receiver architecture (with its superior sensitivity) enables long range operation under low to moderate turbulence conditions and as the multimode receiver enables operation at moderate ranges (even under very strong turbulence conditions). Additionally, the double clad coupler 400 of FIG. 4 can add fade redundancy for when the single mode receiver experiences a deep fade because of poor coupling and not because of lack of power at an aperture.

Referring again to FIG. 2, the controller 240 can be any electrical or electronic circuitry (e.g., field-programmable gate arrays (FPGA) or programmable logic arrays (PLA)) that is configured to, e.g., is physically and/or electrically specifically arranged to, execute computer readable program instructions by utilizing state information therein to personalize the electronic circuitry. In accordance with one or more embodiments and as shown in FIG. 2, the controller 240 has a processor 241, which can include one or more central processing units (CPUs), and be referred to as a processing circuit, microprocessor, and/or computing unit. The processor 241 is coupled via a system bus 242 to a system memory 243 and various other components. The system memory 243, which is an example of a tangible storage medium readable executable by the processor 241, can include read only memory (ROM) and random access memory (RAM). The system memory 243 stores software 244 and data 245. The software 244 is stored as instructions for execution on the controller 240 by the processor 241 (to perform processes, such as the process flow 500 of FIG. 5). The data 245 includes a set of values of qualitative or quantitative variables organized in various data structures to support and be used by operations of the software 244. The controller 240 of FIG. 2 includes one or more interfaces 247 (e.g., one or more adapters, controller, network, or graphics adapters) that interconnect and support communications between the processor 241, the system memory 243, and other components of the optical terminal 200 (e.g., peripheral and external devices). Thus, as configured in FIG. 2, the operations of the software 244 and the data 245 (e.g., the controller 240) are necessarily rooted in the computational ability of the processor 241 and to overcome and address the herein-described shortcomings of the conventional monostatic FSO terminals. In this regard, the software 244 and the data 245 improve computational operations of the processor 241 and/or the controller 240 by receiving the electrical tracking signals from the detectors 231 and performing a feedback control based on the electrical tracking signals to control the mirror package 210.

Note that a consideration during a build process and for maintenance of the optical terminal 200 is that the optical alignment between the beam 201 going to the mirror package 210 and the optical fiber bundle 220 is monitored by the controller 240. In accordance with one or more embodiments, the controller 240 implements a control loop to optimize alignments. In turn, the controller 240 of the optical terminal 200 can account for build and maintenance complexity, along with the effect of vibration or temperature variations. Further, any drift in a relative optical axis between the mirror package 210 and the optical fiber bundle 220 can be detected by the controller 240 to prevent degraded acquisition and tracking. Note that a technical effect and benefit of coupling the electrical tracking signals to the optical tracking fibers is that individual fiber coupled detectors with adaptive biasing circuits can be utilized for dramatically improved noise floors. For example, better than −90 decibel-milliwatts (dBm) has been demonstrated in the lab as compared to quadrant detectors that have about a −70 dBm noise floor due to the shared biasing scheme.

Figure 5:
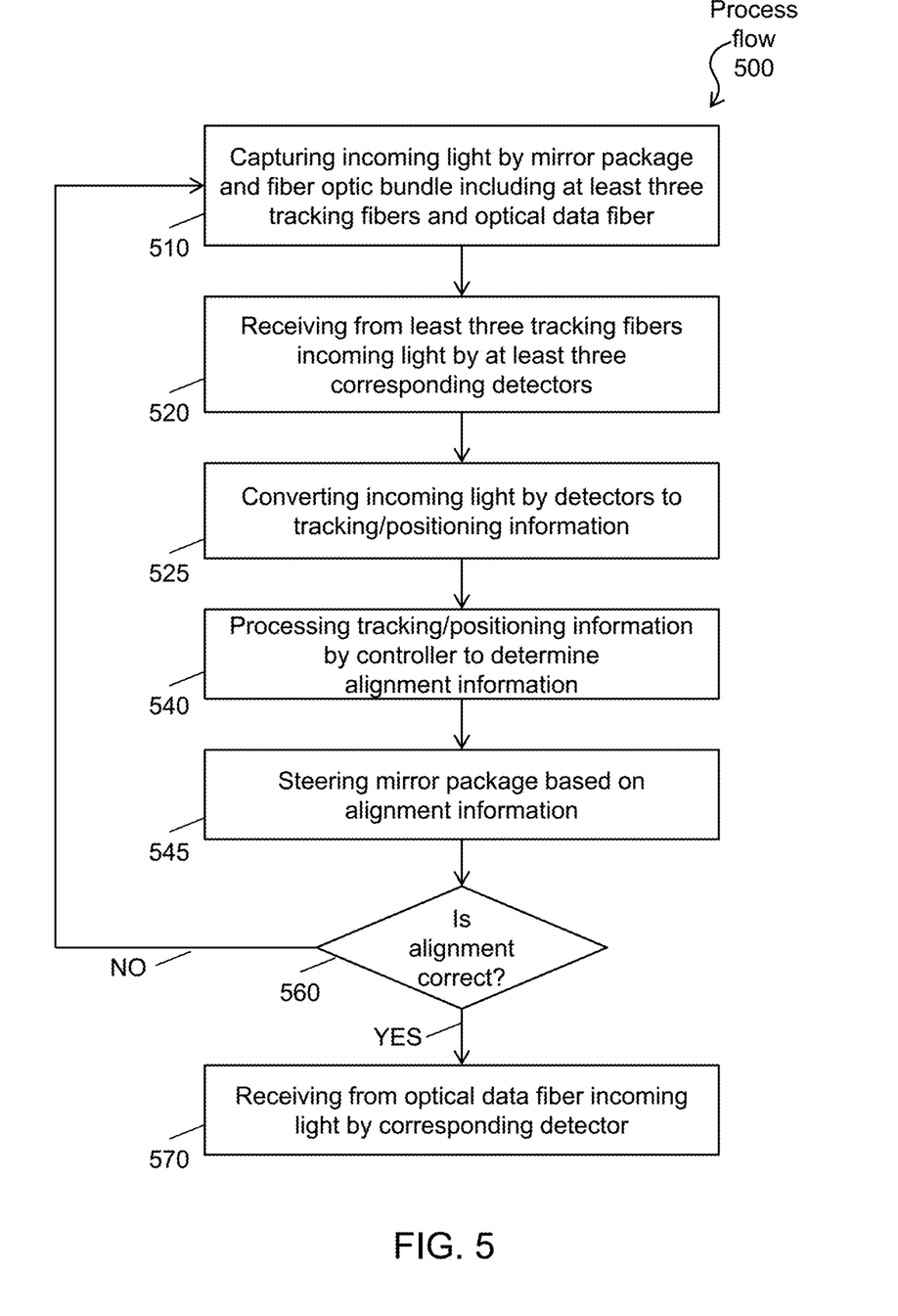
FIG. 5 depicts a process flow according to one or more embodiments.

FIG. 5 depicts a process flow 500 according to one or more embodiments. The process flow 500 is described with respect to the optical terminal 200 of FIG. 2. The process flow 500 begins at block 510, when incoming light (e.g., the beam 201) is captured by the mirror package 210 and the optical fiber bundle 220, which includes at least three tracking fibers and one optical data fiber, as described herein.

At block 520, the at least three detectors 231 corresponding to the least three tracking fibers (e.g., six optical tracking fibers 222) receive the incoming light (e.g., the beam 201). At block 525, the at least three detectors 231 convert the incoming light to tracking/positioning information. At block 540, the controller 240 determines alignment information by processing the tracking/positioning information. At block 545, the mirror package 210 steers the steering mirror 213 based on the alignment information (e.g., the actuator 211 articulate the steering mirror 213 based on control signals generated by the controller 240 in view of the alignment information).

At decision block 560, the optical terminal 200 determines whether the alignment is correct. Determining whether the alignment is correct can include determining whether data received by the optical data fiber is readable or unreadable (e.g., lost, corrupted, or otherwise rendered useless or unusable). If the data is not readable, then the alignment is not correct. If the alignment is not correct, the process flow 500 returns to block 510 (as shown by the NO arrow). If the data is readable, then the alignment is correct. If the alignment is correct, the process flow 500 proceeds to block 570 (as shown by the YES arrow). At block 570, the optical data fiber provides the incoming light (e.g., the beam 201) to any corresponding detectors (e.g., the receivers 237 and 238).

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The Figures illustrate the architecture, functionality, and operation of possible implementations of systems, methods, and computer program products according to various embodiments. In this regard, each block in the Figures may represent one or more components, units, modules, segments, or portions of instructions, which comprise one or more executable instructions for implementing the specified logical function(s). The functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the Figures, and combinations of blocks in the Figures, can be implemented by special purpose hardware-based systems that perform the specified functions or acts or carry out combinations of special purpose hardware and computer instructions.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A device comprising:
   an optical fiber bundle comprising at least one optical data fiber and at least three optical tracking fibers;
   a mirror package configured to direct an incoming optical beam to the optical fiber bundle;
   at least three detectors, each detector corresponding to one of the at least three optical tracking fibers such that a one-to-one relationship exists between each one of the at least three detectors and a corresponding one of the at least three optical tracking fibers, the at least three detectors configured to receive portions of the incoming optical beam from the corresponding optical tracking fibers and convert the portions of the incoming beam to electrical tracking signals; and
   a controller configured to receive the electrical tracking signals from the at least three detectors and generate a feedback control based on the electrical tracking signals to control a position of the mirror package.

2. The device of claim 1, wherein the at least one optical data fiber is a double clad fiber.

3. The device of claim 1, wherein the at least three optical tracking fibers comprise six multimode fibers arranged in a ring around the at least one optical data fiber.

4. The device of claim 1, further comprising at least three optical filters disposed between the optical fiber bundle and a corresponding one of the at least three detectors.

5. The device of claim 1, further comprising a double clad coupler connecting the at least one optical data fiber to at least one of a single mode receiver and a multimode receiver.

6. The device of claim 1, wherein the mirror package comprises an actuator, a mount, and a mirror, wherein the actuator articulates the mirror on the mount based on the feedback control from the controller.

7. The device of claim 1, further comprising a lens that directs the incoming optical beam toward the mirror package.

8. A system comprising:
   a first network comprising a first optical terminal;
   a second network comprising a second optical terminal; and
   an optical data link established between the first and second optical terminals,
   wherein the first optical terminal comprises:
      an optical fiber bundle comprising at least one optical data fiber and at least three optical tracking fibers;
      a mirror package configured to direct an incoming optical beam to the optical fiber bundle;
      at least three detectors, each detector corresponding to one of the at least three optical tracking fibers such that a one-to-one relationship exists between each one of the at least three detectors and a corresponding one of the at least three optical tracking fibers, the at least three detectors configured to receive portions of the incoming optical beam from the corresponding optical tracking fibers and convert the portions of the incoming optical beam to electrical tracking signals; and
      a controller configured to receive the electrical tracking signals from the at least three detectors and generate a feedback control based on the electrical tracking signals to control a position of the mirror package.

9. The system of claim 8, wherein the second optical terminal comprises:
   a second optical fiber bundle comprising at least one optical data fiber and at least three optical tracking fibers;
   a second mirror package configured to direct an optical beam from the first optical terminal to the second optical fiber bundle;
   at least three detectors, each detector corresponding to one of the at least three optical tracking fibers, the at least three detectors configured to receive portions of the incoming optical beam from the corresponding optical tracking fibers and convert the portions of the incoming optical beam to electrical tracking signals; and
   a second controller configured to receive the electrical tracking signals from the at least three detectors and generate a feedback control based on the electrical tracking signals to control the second mirror package.

10. The system of claim 8, wherein the at least one optical data fiber is a double clad fiber.

11. The system of claim 8, wherein the at least three optical tracking fibers comprise six multimode fibers arranged in a ring around the at least one optical data fiber.

12. The system of claim 8, further comprising at least three optical filters disposed between the optical fiber bundle and a corresponding one of the at least three detectors.

13. The system of claim 8, further comprising a double clad coupler connecting the at least one optical data fiber at least one of a single mode receiver and a multimode receiver.

14. The system of claim 8, wherein the mirror package comprises at least an actuator, a mount, and a mirror, wherein the actuator articulates the mirror on the mount based on the feedback control from the controller.

15. The system of claim 8, further comprising a lens that directs the incoming optical beam toward the mirror package.

16. A method comprising:

capturing, by a mirror package and an optical fiber bundle of a first optical terminal, an incoming beam from a second optical terminal, the optical fiber bundle including at least one optical data fiber and a plurality of optical tracking fibers;

converting, by a plurality of detectors coupled to the optical fiber bundle, the incoming beam into a tracking signal, where a number of the plurality of detectors matches a number of the plurality of optical tracking fibers such that a one-to-one relationship exists between each detector of the plurality detectors and a corresponding optical tracking fiber of the plurality optical tracking fibers;

processing, by a controller of the optical terminal, the tracking signal to generate alignment information and determine, based on the alignment information, whether an alignment of the incoming beam is correct; and articulating, by the controller, the mirror package based on the alignment information, when the alignment of the incoming beam is not correct.

17. The method of claim 16, wherein the converting by the plurality of detectors further comprises converting the incoming beam into a data signal, and the processing by the controller further comprises determining whether the data signal is readable.

18. The method of claim 17, further comprising providing additional information for the processing of the tracking signal when the data signal is not readable.

19. The method of claim 16, further comprising dividing, by a double clad coupler connecting the at least one optical data fiber to single and multimode receivers, the beam into single and multimode signals.

20. The method of claim 16, further comprising sending, by the optical terminal, an outgoing beam to the second optical terminal.

* * * * *